United States Patent [19]
Zenmei et al.

[11] Patent Number: 5,575,366
[45] Date of Patent: Nov. 19, 1996

[54] VEHICULAR CHARGING GENERATOR

[75] Inventors: Keisaku Zenmei; Keiichi Konishi; Shuzo Isozumi; Akira Morishita, all of Himeji, Japan

[73] Assignee: Mitsubishi Denki Kabushiki Kaisha, Tokyo, Japan

[21] Appl. No.: 421,914

[22] Filed: Apr. 13, 1995

[30] Foreign Application Priority Data

Nov. 10, 1994 [JP] Japan .................................. 6-276543

[51] Int. Cl.$^6$ ............................. H02K 7/10; F16D 41/066
[52] U.S. Cl. .................................. 192/45; 322/42; 310/78
[58] Field of Search ........................ 192/41 R, 45; 474/70; 310/78; 322/12, 40, 41, 42, 43

[56] References Cited

U.S. PATENT DOCUMENTS

| | | | |
|---|---|---|---|
| 2,383,872 | 8/1945 | MacPherson | 322/43 X |
| 2,866,349 | 12/1958 | Heckethorn | 192/41 R X |
| 2,955,478 | 10/1960 | Davis | 474/70 X |
| 3,194,368 | 7/1965 | Benson et al. | 192/45 |
| 4,725,259 | 2/1988 | Miyata | 474/70 |
| 5,139,463 | 8/1992 | Bytzek et al. | 474/70 X |

FOREIGN PATENT DOCUMENTS

| | | |
|---|---|---|
| 2197431 | 5/1988 | Germany . |
| 0553471A2 | 8/1993 | Germany . |
| 56-101353 | 8/1981 | Japan . |
| 60-131046 | 7/1985 | Japan . |
| 62-144546 | 6/1987 | Japan . |

Primary Examiner—Richard M. Lorence
Attorney, Agent, or Firm—Sughrue, Mion, Zinn, Macpeak & Seas

[57] ABSTRACT

A vehicular charging generator provided with a one-way clutch having a clutch inner installed to a shaft of a rotor and a clutch outer interposed between the clutch inner and a pulley driven by a power unit for driving a vehicle and transmitting a power only in one rotational direction from the pulley to the shaft, wherein a male screw is formed on the shaft, a female screw is formed on an inner peripheral portion of the clutch inner and the female screw is engaged with the male screw thereby fixing the clutch inner to the shaft.

10 Claims, 4 Drawing Sheets

VEHICULAR CHARGING GENERATOR

BACKGROUND OF THE INVENTION

1. Field of the Invention

This invention relates to a vehicular charging generator having a one-way clutch.

2. Discussion of the Invention

Figure 5:
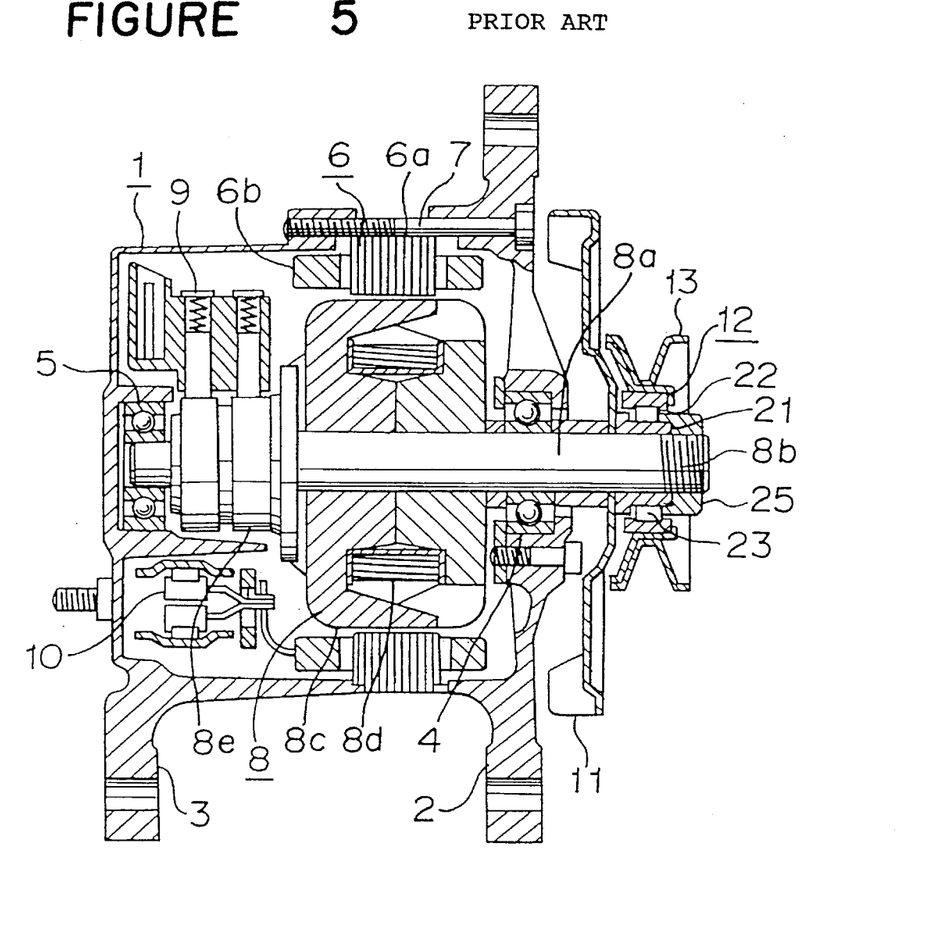
FIG. 5 is a construction view showing the construction of a conventional vehicular charging generator.
Figure 6:
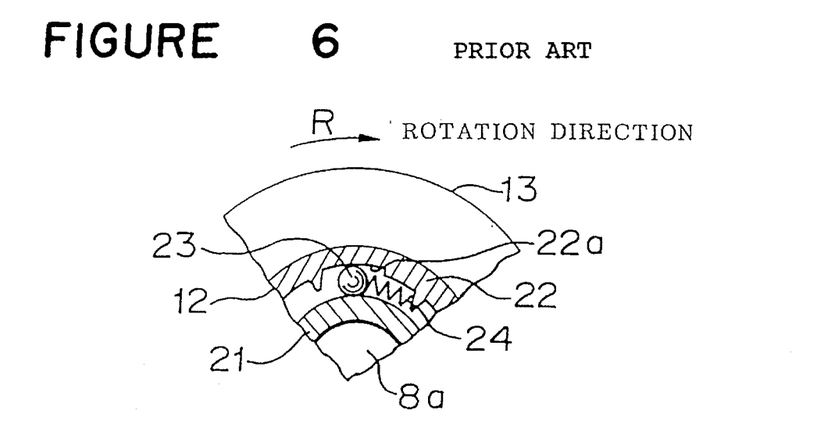
FIG. 6 is a partially magnified view showing the detailed construction of a clutch of the conventional vehicular charging generator.

FIG. 5 and FIG. 6 show a conventional vehicular charging generator (hereinafter, generator) which is shown, for instance, in Japanese Unexamined Patent Publication No. 101353/1981, wherein FIG. 5 is a construction view of a generator and FIG. 6 is a partially magnified view showing the detailed construction of a one-way clutch. In FIGS. 5 and 6, numeral 1 designates a main body of a generator which is constructed as follows. Numeral 2 designates a front bracket, numeral 3 designates a rear bracket, and the central portions of the brackets are installed with a front bearing 4 and a rear bearing 5, respectively. Numeral 6 designates an armature having an armature core 6a and an armature coil 6b which is wound around the armature core 6a. The armature core 6a is interposed between the both brackets by clamping it to the both brackets by a clamp bolt 7 in the horizontal direction of FIG. 5.

Numeral 8 designates a rotor having a rotor shaft 8a, a male screw 8b which is worked on the right end portion of the rotor shaft 8a in FIG. 5, a cylindrical pole body 8c having claw-formed magnetic poles which are fitted to the rotor 8a, a field coil 8d which is wound around the pole body 8c, and slip rings 8e which are attached to the rotor shaft and connected to the field coil 8d. Further, the rotor 8a is rotatably supported by the both brackets 2 and 3 through the bearings 4 and 5 such that the pole body 8c is disposed on the inner side of the armature core 6a.

Numeral 9 designates brushes which supply an exciting current to the field coil 8d through the slip rings 8e. Numeral 10 designates a rectifier which rectifies an alternate current power generated in the armature coil 6b. The brushes 9 and the rectifier 10 are attached to the inside of the rear bracket 3. Numeral 11 designates a fan which is disposed outside of the front bracket 2 and is fitted to the rotor 8a and which rotates along with the rotor 8 and sends outer air to the inside of the main body of the generator to thereby cool it. The main body of the generator 1 is constructed as above.

Numeral 12 designates a one-way clutch, numeral 13 designates a pulley and the one-way clutch 12 is arranged between the rotor shaft 8a and the pulley 13.

Next, an explanation will be given of the detailed construction of the one-way clutch 12 also in reference to FIG. 6. Numeral 21 designates a clutch inner, numeral 22 designates a clutch outer, and notation 22a designates a plurality of wedge-like grooves (FIG. 6). The plurality of grooves 22a are provided at the inner peripheral portion of the clutch outer 22 in the circumferential direction, and as shown in FIG. 6, each has a wedge-shaped section in a direction orthogonal to the shaft in which the depth thereof in the radial direction becomes shallower toward the lefthand direction. Numeral 23 designates rollers, and numeral 24 designates roller springs. The rollers 23 are inserted in the grooves 22a between the clutch inner 21 and the clutch outer 22, and are pressed by the roller springs 24 in a direction counter to an arrow mark R in FIG. 6 in which the rotors 8 are driven.

The clutch inner 21 is fitted to the rotor shaft 8a and is prevented from coming out in the axial direction by a nut 25 (FIG. 5) which is engaged with the male screw 8b. The clutch outer 22 is press-fitted to the pulley 13.

Next, an explanation will be given of the operation.

This generator is a three-phase synchronous generator wherein the rotor 8 is driven in the arrow mark R direction of FIG. 6 through a belt (not shown) which spans between an engine, not shown, that is a power unit and the pulley 13. By the rotation of the rotor 8, a three-phase alternate current power is generated in the armature winding 6b, and a power necessary for a vehicle is supplied by converting the alternate current power to a direct current by the rectifier 10.

The one-way clutch 12 operates as follows in pulsating or accelerating or decelerating of an engine. That is, when the engine is accelerated, the clutch transmits a torque and the rotor is driven by the engine. Conversely, when the engine is decelerated, the rotor is not decelerated since the clutch slips, and continues running by inertia thereby achieving effects of the promotion of energy efficiency, the promotion of belt life and the like.

A further detailed explanation will be given of the operation of the one-way clutch 12. The pulley 13 is driven in the arrow mark R direction of FIG. 6 by the engine. When the rotation speed of the engine is faster than the rotation speed of the rotor 8 of the generator, the rollers 23 which are being pushed in a direction counter to the arrow mark R by the roller springs 24, move at the inside of the groove 22a in the lefthand direction of FIG. 6. As a result, the rollers 23 wedge in between the clutch inner 21 and the clutch outer 22, thereby transmitting the power of the pulley 13 to the rotor shaft 8a.

On the other hand, in decelerating the engine, especially in rapidly decelerating it, the rotation speed of the clutch inner 21 becomes faster than the rotation speed of the clutch outer 22 by the inertia force of the rotor 8. Accordingly, the wedging of the rollers 23 is released since the rollers 23 move in the righthand direction of FIG. 6 against the spring force of the roller springs 24. Therefore, the rotor 8 is decelerated while converting the rotational energy of the rotor, per se into an electric power, without being decelerated by the deceleration of the engine.

There are following problems since the conventional generator is constructed as above.

(1) The clutch outer 22 and the pulley 13 are separately constructed, and the pulley 13 is press-fitted to the clutch outer 22, and therefore, the number of parts is increased and much time is required for the integrating operation. Further, the quality may dispersingly deteriorated by the lowering of accuracy at the engaging portions of the rollers due to a warp of the clutch outer which has been accompanied by the press-fitting operation.

(2) After the clutch inner 21 has been fitted to the rotor shaft 8a, it is prevented from coming out by the nut 25, and therefore, the number of parts is similarly increased and much time is required for the integrating operation.

(3) There is no independent bearing between the clutch outer 22 and the clutch inner 21. Therefore, no consideration has been given to a load of the clutch which is applied by driving the belt, and the like and the improvement of durability has been requested.

(4) No consideration has been given to the dust proof and water proof performance of the clutch. Therefore, a measure in view thereof is necessary.

SUMMARY OF THE INVENTION

It is an object of the present invention to solve the above problems and to provide a highly productive and inexpensive generator. Further, it is another object of the present invention to provide a generator the durability of which can be improved.

According to a first aspect of the present invention, there is provided a vehicular charging generator provided with a one-way clutch having a clutch inner installed to a shaft of a rotor and a clutch outer interposed between the clutch inner and a pulley driven by a power unit for driving a vehicle and transmitting a power only in one rotational direction from the pulley to the shaft, wherein a male screw is formed on the shaft, a female screw is formed on an inner peripheral portion of the clutch inner and the female screw is engaged with the male screw thereby fixing the clutch inner to the shaft.

According to a second aspect of the present invention, there is provided the vehicular charging generator according to the first aspect, wherein a non-threaded portion in which a screw is not formed is provided on the inner peripheral portion of the clutch inner and a clearance between the non-threaded portion and the shaft is equal to or less than a predetermined value.

According to a third aspect of the present invention, there is provided a vehicular charging generator provided with a one-way clutch having a clutch inner installed on a shaft of a rotor and a clutch outer interposed between the clutch inner and a pulley driven by a power unit for driving a vehicle and transmitting a power only in one rotational direction from the pulley to the shaft, wherein the clutch outer is integrally formed with the pulley.

According to a fourth aspect of the present invention, there is provided the vehicular charging generator according to the third aspect, wherein a male screw is formed on the shaft, a female screw is formed on an inner peripheral portion of the clutch inner and the female screw is engaged with the male screw thereby fixing the clutch inner to the shaft.

According to a fifth aspect of the present invention, there is provided a vehicular charging generator provided with a one-way clutch having a clutch inner combined with a shaft of a rotor and a clutch outer interposed between the clutch inner and a pulley driven by a power unit for driving a vehicle and transmitting a power only in one rotational direction from the pulley to the shaft, wherein the shaft and the clutch inner are integrally formed.

According to a sixth aspect of the present invention, there is provided the vehicular charging generator according to the fifth aspect, wherein the clutch outer and the pulley are integrally formed.

According to a seventh aspect of the present invention, there is provided a vehicular charging generator provided with a one-way clutch having a clutch inner installed to a shaft of a rotor, a clutch outer interposed between the clutch inner and a pulley driven by a power unit for driving a vehicle through a belt and rollers interposed between the clutch outer and the clutch inner and transmitting a power only in one rotational direction from the pulley to the shaft through the rollers, wherein a pair of bearings are installed between the clutch outer and the clutch inner interposing the rollers in an axial direction for supporting a load of the pulley and sealing members are provided on side faces of the pair of bearings counter to the rollers for sealing the pair of bearings.

According to an eighth aspect of the present invention, there is provided the vehicular charging generator according to the seventh aspect, wherein lubricants having a same material are filled in the pair of bearings and peripheral portions of the rollers.

According to a ninth aspect of the present invention, there is provided the vehicular charging generator according to the seventh aspect, wherein a first outer diameter at a portion of an outer peripheral portion of the clutch inner opposing the rollers is equal to a second outer diameter of a portion thereof in which the pair of bearings are installed.

According to a tenth aspect of the present invention, there is provided the vehicular charging generator according to the seventh aspect, wherein a flange protruding in a radial direction is installed to the clutch inner, a washer is installed to the shaft and the pair of bearings are interposed by the washer and the flange.

According to the first aspect of the vehicular charging generator, the clutch inner is fixed to the shaft by engaging the male screw provided on the shaft to the female screw provided on the clutch inner. Therefore, a fastening nut is dispensed with and the number of parts is reduced. Further, the male screw of the rotor shaft 5 for engaging the clutch inner can be disposed at the inner side in the axial direction of the clutch inner, and therefore, the length of the rotor shaft and accordingly that of the generator in the axial direction can be shortened.

According to the second aspect of the vehicular charging generator, the clearance between the non-threaded portion of the clutch inner and the shaft is equal to or less than a predetermined value. The non-threaded portion of the clutch inner is accurately guided when the clutch inner is attached to the shaft, and the eccentricity due to the clearance of the engaging portion of the male screw and the female screw is restricted. Accordingly, the integration operation is facilitated and the integration accuracy is improved.

According to the third aspect of the vehicular charging generator, the clutch outer and the pulley are integrally formed, and therefore, the number of parts is reduced and the integration steps are also reduced. Further, it is not necessary to press-fit the clutch outer into the pulley, and therefore, the warp accompanied by the press-fitting operation is not caused which amounts to the improvement of the quality.

According to the fourth aspect of the vehicular charging generator, the clutch outer and the pulley are integrally formed, and a fastening nut is dispensed with by fixing the clutch inner to the shaft by engaging the male screw provided on the shaft with the female screw provided on the clutch inner. Accordingly, the number of parts is further reduced and the integration steps are further reduced.

According to the fifth aspect of the vehicular charging generator, the rotor shaft and the clutch inner are integrally formed. That is, the shaft also serves as the clutch inner. Accordingly, both the number of parts and the integration steps are reduced.

According to the sixth aspect of the vehicular charging generator, the clutch outer and the pulley are integrally formed further, and therefore, the number of parts is further reduced.

According to the seventh aspect of the vehicular charging generator, the torque which bearings transmit by receiving the load applied on the pulley, is restrained from dispersingly changing among the plurality of rollers. Accordingly, the reliability and life are improved. Further, dust proof and water proof operations are carried out by the sealing members, and therefore, the environment resistance is promoted.

According to the eighth aspect of the vehicular charging generator, lubricants having the same material are filled in the bearing and in the peripheral portions of the rollers and the both lubricants may mix together. Therefore, sealing members which prevent the both lubricants in the bearings and in the peripheral portions of the rollers from mixing are dispensed with, and the manufacturing cost is reduced.

According to the ninth aspect of the vehicular charging generator, there is no step difference between a portion of the outer peripheral portion of the clutch inner counter to the rollers and a portion thereof wherein the bearings are attached. Therefore, the working of the outer peripheral portion of the clutch inner is facilitated and the working steps are reduced. Further, the inserting operation of the clutch inner into the clutch outer is facilitated and the integration steps are reduced also in view thereof.

According to the tenth aspect of the vehicular charging generator, the bearings are restrained from moving in the axial direction since the bearings are interposed by the flange and the washer in the axial direction. Therefore, even in case wherein a thrust load is operated on the bearings by a moment of the load of the belt due to an error of a center of pulley or the like, the movement of the bearings is restrained and the life of the bearings is stabilized.

DESCRIPTION OF THE PREFERRED EMBODIMENTS

EXAMPLE 1

Figure 1:
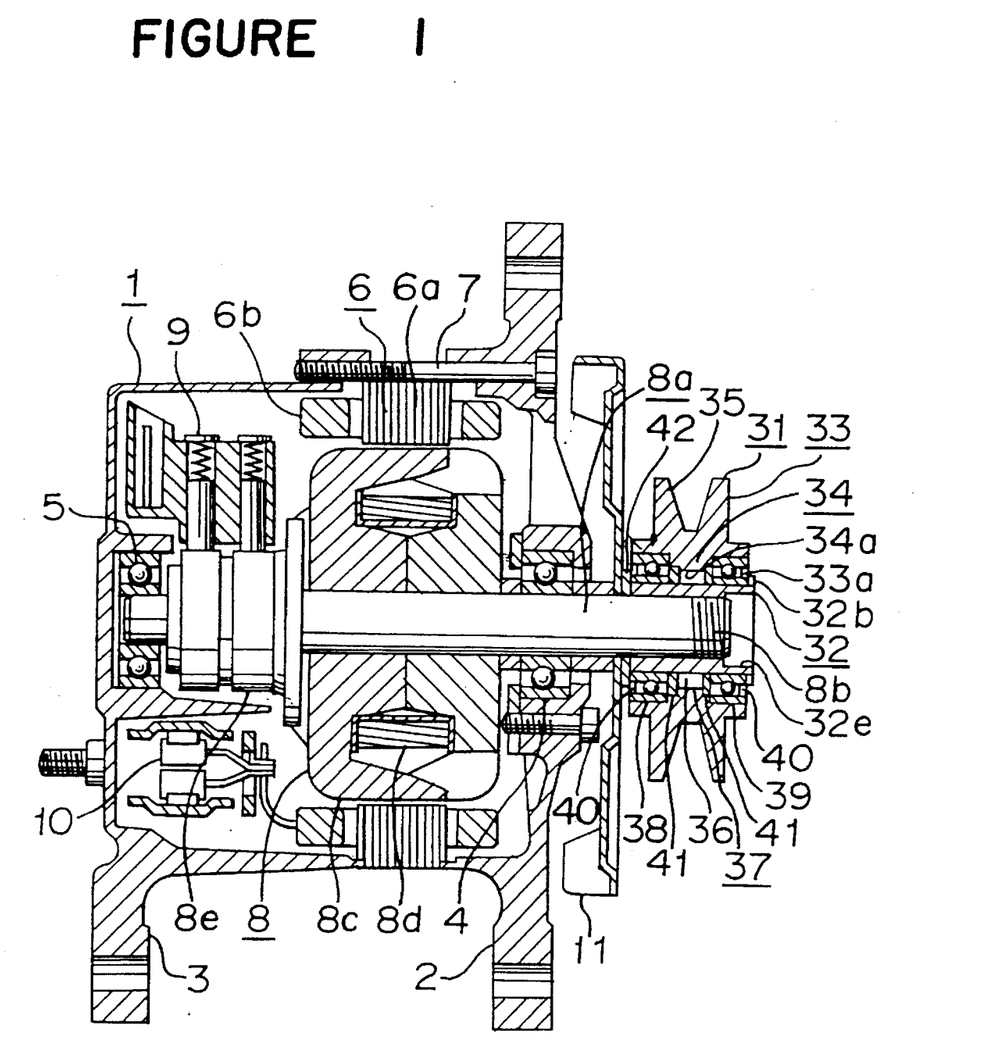
FIG. 1 is a construction view showing an example of this invention.
Figure 2:
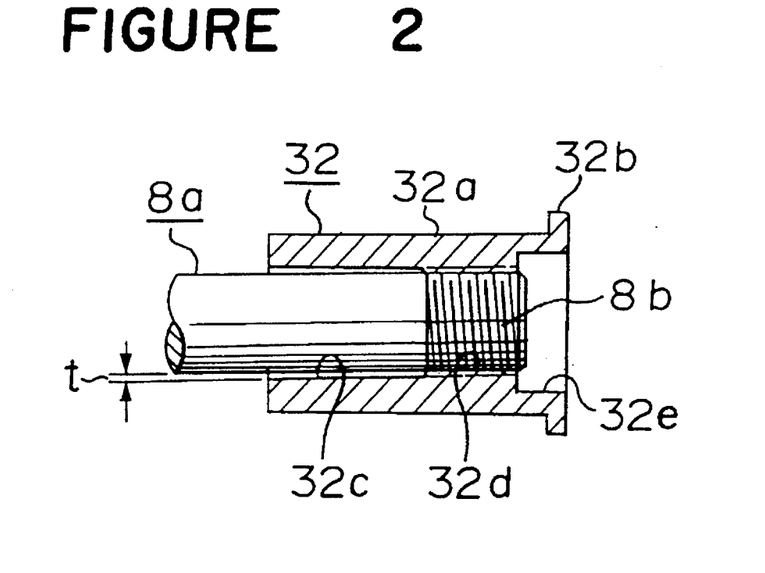
FIG. 2 is a magnified view showing the detailed construction of a clutch inner of a one-way clutch in the example of this invention.

An explanation will be given of an example of this invention as follows in reference to the drawings. FIG. 1 is a construction view showing the construction of a generator and FIG. 2 is a magnified view showing the detailed construction of a clutch inner of a one-way clutch. In FIG. 1 and FIG. 2, notations 1 through 11 designate the same as the conventional portions shown in FIG. 6, and therefore, the corresponding one is attached with the same notation and the explanation will be omitted. However, this example is different from the conventional example at the point wherein the rotor shaft 8a is shorter than the conventional one as shown in FIG. 1.

Numeral 31 is a one-way clutch which is constructed as follows. Numeral 32 designates a clutch inner which has a hollow cylinder shape and wherein a flange 32b having an enlarged outer diameter, is integrally provided at the right end portion of an outer peripheral portion 32a, as shown in FIG. 2. Further, a female screw 32d is provided on the right side of a hollow portion 32c which is a non-threading portion having no screw. Further, a hexagon socket 32e is provided at the right end of the hollow portion 32c. This hexagon socket 32e is for turning the clutch inner by a hexagonal wrench when the clutch inner 32 is made engage with the male screw 8b of the rotor shaft. The nut 25 in FIG. 5 in the conventional example is dispensed with, by which the total length of the rotor shaft 8a and accordingly that of the generator can be shortened.

A clutch outer 34 and a pulley 35 are integrally formed into a rotating member 33, which is manufactured by forging a forging steel. At the central portion on the inner peripheral side of the rotating member 33, the clutch outer 34 is formed wherein a plurality of wedge-like grooves 34a similar to those shown in FIG. 6 are provided. Further, at both sides of the inner peripheral portion of the rotating member 33, stepped portions 33a are provided interposing the clutch outer 34, in which ball bearings, mentioned later, are fitted. Numeral 36 designates rollers, which are installed in the wedge-like groves 34a between the clutch inner 32 and the clutch outer 34 similar to those as shown in FIG. 6. As stated above, an engaging and disengaging portion 37 is constructed by the outer peripheral portion 32a of the clutch inner, the grooves 34a of the clutch outer and the rollers 36.

Numerals 38 and 39 designate ball bearings. Annular sealing members 40 are respectively attached on the lefthand side (on the side of the main body 1 of the generator) of the ball bearing 38 and on the righthand side of the ball bearing 39 and between the respective inner rings and outer rings. Further, sealing members are not provided on the inner sides of the ball bearings 38 and 39 counter to the above sides for reducing cost. Although naturally, grease is filled in the ball bearings 38 and 39 for lubrication, it is not necessary to especially provide the sealing members for dust proof and water proof or the like on these inner sides.

The ball bearings 38 and 39 are fitted to the stepped portions 33a of the rotating member 33 in a close fit state and the outer rings of the ball bearings contact the stepped portions 33a which receive a thrust load of the pulley 35. The inner rings of the ball bearings 38 and 39 are fitted to the clutch inner 32 in a clearance fit in which a small clearance is provided therebetween, in view of the integration performance.

Numeral 41 designates washers provided interposing the rollers 36 in the axial direction, which prevent the rollers 36 from toppling down. Further, grease (not shown) for lubrication is filled in the peripheral portions of the rollers including the grooves 34a surrounded by the washers, the clutch outer 34 and the clutch inner 32. Numeral 42 designates a washer which is installed as being interposed by the lefthand side of the clutch inner 32 and the fan of the main body 1 of the generator.

The one-way clutch 31 constructed as above is integrated and installed to the rotor shaft 8a, in the following way. First, the one-way clutch 31 is integrated. The washer 41 is installed to the step portion 33a of the rotating member 33 at the righthand side of FIG. 1, and the ball bearing 39 on the righthand side of FIG. 1 is press-fitted. Next, the clutch inner 32 is inserted into the inner ring of the bearing 39. At this instance, the clutch inner can easily be inserted into the inner ring, since a clearance fit is formed between the inner ring of the ball bearing 39 and the outer peripheral portion 32a of the clutch inner 32 in which a small clearance is provided therebetween as stated above. Further, the grooves 34a of the clutch outer 34 (rotating member 33) are inserted with the rollers 36 and roller springs similar to those as shown in FIG. 6, although they are not shown in FIG. 1. Next, the washer 41 on the lefthand side of FIG. 1 is inserted into the stepped portion 33a on the lefthand side of FIG. 1. Finally, the ball bearing 38 on the lefthand side of FIG. 1 is press-fitted into the stepped portion 34a.

This operation is performed actually by laying the rotating member 33 horizontally such that the lefthand portion of the one-way clutch 31 in FIG. 1 is disposed on the top side. At this moment, grease for lubrication is filled in the engaging and disengaging portion 37. This grease is selected by putting emphasis on the torque transmitting function in view of the operation of the one-way clutch.

The assembly as integrated as above is installed to the rotor shaft 8a wherein the washer 42 has previously been inserted. The one-way clutch 31 is fixed to the rotor shaft 8a by engaging the female screw 32d with the male screw 8b provided on the rotor shaft 8a and by engaging a hexagonal wrench with the hexagon socket 32e and by turning it. At this instance, a clearance t has been set as shown in FIG. 2, so that the inner diameter of the hollow portion 32c is fitted to the rotor shaft 8a in a clearance fit having a small clearance. Accordingly, in fitting the one-way clutch to the rotor shaft 8a, the rotor shaft serves as a guide and eccentricity due to a clearance at the engaging portion of the male screw 8b and the female screw 32d is restricted.

The operation of the one-way clutch 31 constructed as above is similar to the conventional one as shown in FIG. 5.

In this example, the rotating member 33 in which the clutch outer 34 and the pulley 35 are integrally formed, is employed. Therefore, the number of parts is reduced and the integration steps can also be reduced since it is not necessary to press-fit the clutch outer into the pulley. Naturally, the problems of the lowering of accuracy at the wedging portion of the rollers caused by the warp of the clutch outer which is accompanied through the press-fitting operation, and the like are totally dispensed with, which amounts to the stabilization of quality.

Further, a fastening nut can be omitted since the female screw 32d is provided on the inner peripheral portion of the clutch inner 32 and the integration of the one-way clutch to the main body of the generator is performed by fastening the clutch inner per se. For the fastening operation, the hexagon socket 32e is provided and a hexagonal wrench is used. The total length of the rotor shaft 8a and accordingly, that of the generator can be shortened since the male screw 8b of the rotor shaft for engaging with the clutch inner 32, can be provided inside of the clutch inner in the axial direction.

Further, the eccentricity due to the clearance at the engaging portion (of the female screw 32d and the male screw 8b) can be restricted, since the outer peripheral portion of the rotor shaft 8a becomes a guide in fastening the clutch inner by rendering small the clearance t between the hollow portion 32c of the clutch inner and the rotor shaft 8a.

The portion of the clutch inner 32 opposing the rollers 36 and the portion thereof to which the bearings 38 and 39 are installed, are provided with the same diameter and there is no step difference therebetween. Therefore, the working of the clutch inner is facilitated, the integration performance is promoted, and the integration can easily be performed as stated above.

Further, the bearings 38 and 39 are arranged at the both sides of the engaging and disengaging portion 37, and the bearings receive the load of a belt such that the plurality of rollers 36 transmit the torque uniformly.

The respective inner rings of the ball bearings 38 and 39 are retained by the washer 42 and the flange 32b of the clutch inner and the outer rings thereof are retained by the stepped portions 33a of the rotating member 33 as above. Thereby, the movement of the pulley 35 in the thrust direction is restricted in case wherein a thrust load is operated on the clutch unit by a moment of a belt load due to an error in the center of pulley or the like, thereby achieving the stabilization of life of the bearings.

The seal members 40 are provided at least at the outer sides (on the lefthand side of the bearing 38 and on the righthand side of the bearing 39) to improve the environment resistance such as dust proof and water proof, and the inner sides thereof are open for reducing cost, which is a one-side sealing structure.

In such a one-way clutch, the major point is the slipping function as stated above. Therefore, it is possible to render grease for lubrication in the clutch the same with that in the ball bearings, and it is not necessary to especially shield the engaging and disengaging portion 37 (surrounding portions of rollers) from the ball bearings 38 and 39. Naturally, there is a case wherein different kinds of greases are employed. In that case, it is possible to prepare a both-sides sealing structure for the ball bearings 38 and 39 and to prevent the respective greases at the engaging and disengaging portion and the ball bearings from mixing together.

Naturally, although ball bearings having the both-sides sealing structure may be employed even if the greases for them are the same, the reduction in manufacturing cost can be achieved by omitting the sealing members on the inner sides of the bearings especially when the both greases are the same.

EXAMPLE 2

Figure 3:
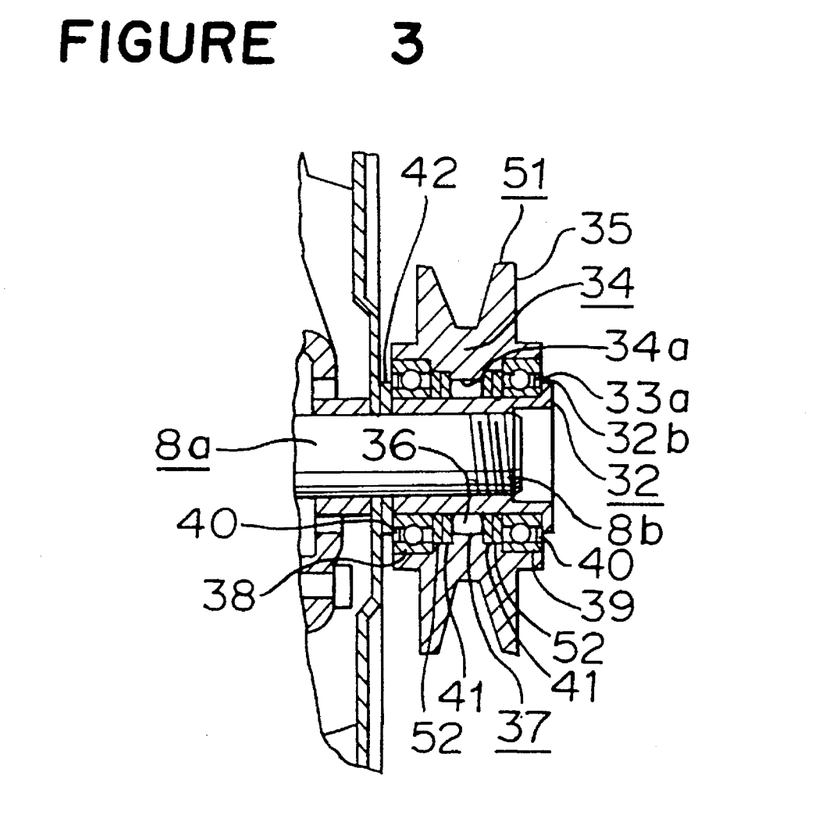
FIG. 3 is a construction view showing other example of this invention.

FIG. 3 is a construction view showing other example of this invention. An explanation will be given of this example as follows. Numeral 51 designates a one-way clutch, wherein oil seals 52 are installed respectively between the ball bearings 38 and 39 and the engaging and disengaging portion 37 (clutch unit). The other construction is the same as in the Example of FIG. 1.

The oil seals 52 shield the ball bearings 38 and 39 from the engaging and disengaging portion 37. Further, the rotor shaft 8a and the clutch inner 32 are fitted to each other in a clearance fit in view of the clutch integration performance. Therefore, this example completely prevents grease in the clutch unit from flowing out from the clearance thereby achieving the improvement of reliability.

In using the oil seals 52, it is not necessary to be particular about the sealing performance between the bearings and the engaging and disengaging portion. However, when different greases are employed in the ball bearings 38 and 39, and in the engaging and disengaging portion 37, these oil seals 52 can prevent the mixing of the both greases even if the ball bearings are of a one-side sealing structure in which the inner sides of the bearings are open.

Further, in the example of FIG. 3, the sealing members 40 are provided on the lefthand side of the ball bearing 38 and on the righthand side of the ball bearing 39. However, oil seals similar to the oil seals 52 may be provided instead of the sealing members 40, if necessary.

EXAMPLE 3

Figure 4:
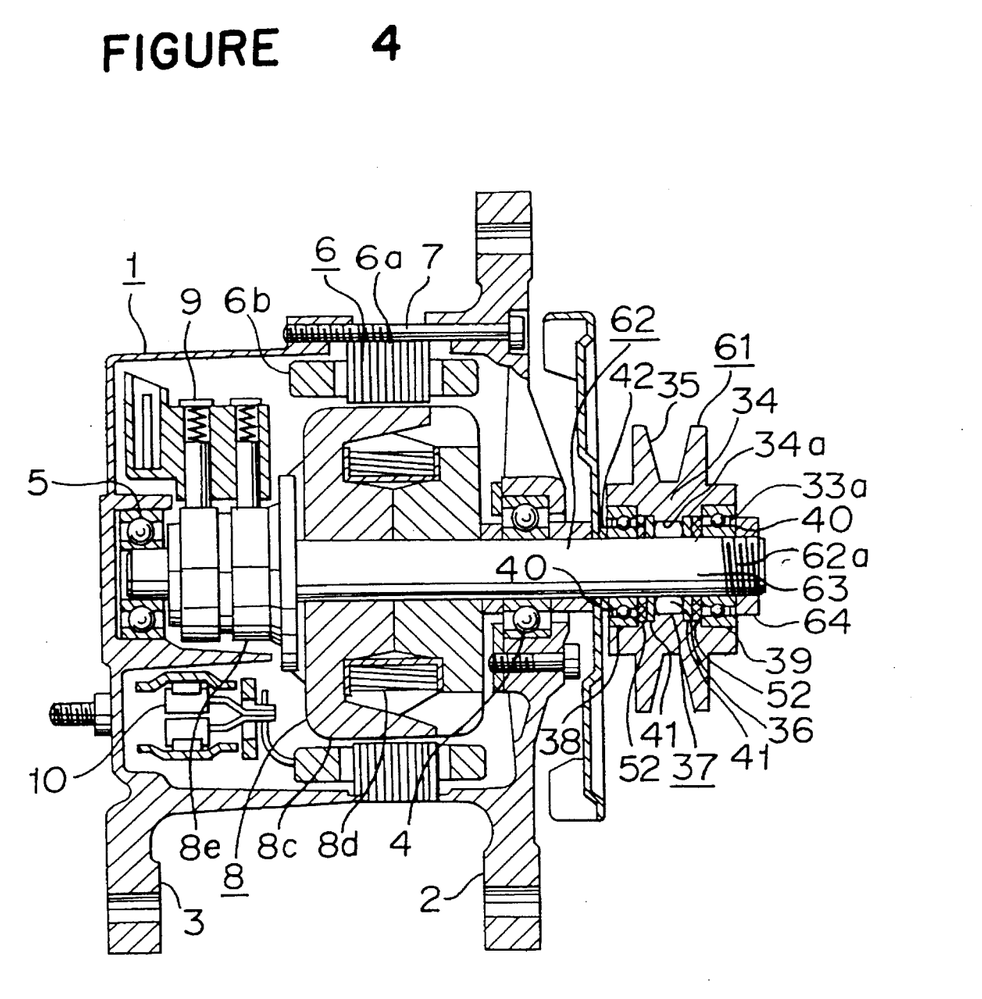
FIG. 4 is a construction view showing other example of this invention.

FIG. 4 is a construction diagram showing other example of this invention. In this example, the rotor shaft serves also as a clutch inner. An explanation will be given of the construction as follows.

Numeral 61 designates a one-way clutch wherein a rotor shaft 62 also serves as a clutch inner 63. That is, the rotor shaft 62 has the function of the clutch inner 63. In this case, the rotor shaft 62 is provided with a male screw 62a and a nut 64 is engaged with the male screw 62a by which the pulley having a one-way clutch is fastened to the rotor shaft

62. A forging steel is used for the rotor shaft 63, and a portion of the rotor shaft 63 opposing the rollers 36 at the outer peripheral portion of the clutch inner 63 is performed with an induction hardening. The other construction is the same as in Example 1 of FIG. 1.

The improvement in the deflection accuracy of the pulley 35 with respect to the rotor shaft 62 can be achieved by the rotor shaft 62 which also serves as the clutch inner 63. Further, a dimensional allowance is provided in the radial direction of the one-way clutch, a degree of freedom in design for the sizes of the bearings 38 and 39, the selection of the diameter of the rollers 36 and the like is enhanced and as a result, the promotion of life and the improvement in reliability can be achieved.

Further, the power unit may naturally be an internal combustion engine such as a gasoline engine or a diesel engine, or may be a power unit of an electric automobile, and the vehicular charging generator is not restricted to a three-phase synchronous generator.

According to the vehicular charging generator in accordance with the first aspect of the present invention, the male screw is formed on the rotor shaft of the main body of the generator, the female screw is formed on the inner peripheral portion of the clutch inner, and the clutch inner is fixed to the shaft by engaging the male screw with the female screw. Therefore, a fastening nut is dispensed with and the number of parts can be reduced.

According to the vehicular charging generator in accordance with the second aspect of the present invention, the non-threaded portion is provided on the inner peripheral portion in the axial direction of the clutch inner in which no screw is formed, and the clearance between the non-threaded portion and shaft is equal to or less than the predetermined value. Therefore, the clutch inner is accurately guided when the clutch inner is installed to the shaft, and the eccentricity due to the clearance at the engaging portion of the male screw and the female screw is restricted. Accordingly, the integration operation is facilitated, the integration accuracy is promoted, and the reliability is improved.

According to the vehicular charging generator in accordance with the third aspect of the present invention, the clutch outer and the pulley are integrally formed. Therefore, the number of parts can be reduced and also the integration steps can be reduced. Further, the warp accompanied through the press-fitting operation is not caused which amounts to the improvement in the quality.

According to the vehicular charging generator in accordance with the fourth aspect of the present invention, the clutch outer and the pulley are integrally formed, the male screw is provided on the rotor shaft of the main body of the generator, the female screw is formed on the inner peripheral portion of the clutch inner, and the clutch inner is fixed to the shaft by engaging the male screw with the female screw. Therefore, the number of parts can further be reduced and also the integration steps can be reduced.

According to the vehicular charging generator in accordance with the fifth aspect of the present invention, the rotor shaft of the main body of the generator and the clutch inner are integrally formed. Therefore, both the number of parts and the integration steps can be reduced.

According to the vehicular charging generator in accordance with the sixth aspect of the present invention, the clutch outer and the pulley are integrally formed and the rotor shaft of the main body of the generator and the clutch inner are integrally formed. Therefore, the number of parts can further be reduced, and also the integration steps can be reduced.

According to the vehicular charging generator in accordance with the seventh aspect of the present invention, the load of the pulley is supported by providing the pair of bearings between the clutch outer and the clutch inner interposing the rollers in the axial direction. Further, the sealing members for sealing the bearings are provided on the side faces of the bearings counter to the roller. The transmitted torque is restrained from dispersingly changing among the plurality of rollers whereby the reliability and life are promoted. Further, the environment resistance is promoted by the dust proof and water proof performance of the sealing members.

According to the vehicular charging generator in accordance with the eighth aspect of the present invention, lubricants having the same material are filled in the bearings and in the peripheral portions of the rollers. Therefore, the sealing members preventing the both lubricants from mixing among the bearings and the peripheral portions of the rollers are dispensed with by which the manufacturing cost becomes inexpensive.

According to the vehicular charging generator in accordance with the ninth aspect of the present invention, the outer diameter of the portion of the outer peripheral portion of the clutch inner opposing the rollers are the same with the diameter of the portion thereof to which the bearings are provided. Therefore, the working of the outer peripheral portion of the clutch inner is facilitated and the working steps are also reduced.

According to the vehicular charging generator in accordance with the tenth aspect of the present invention, the flange protruding in the radial direction is provided at the clutch inner, the washer is attached to the shaft and the bearings are interposed by the washer and the flange. Therefore, the movement of the bearings in the axial direction due to a thrust load is restricted, the life of the bearings is stabilized and the reliability is improved.

What is claimed is:

1. A charging generator provided with a one-way clutch, said one-way clutch comprising:

a clutch inner installed on a shaft of a rotor of said generator; and a clutch outer interposed between the clutch inner and a pulley driven by a power unit and transmitting power only in one rotational direction from the pulley to the shaft;

wherein a male screw is formed on the shaft, a female screw is formed on an inner peripheral portion of the clutch inner and the female screw is engaged with the male screw, thereby fixing the clutch inner to the shaft.

2. The charging generator according to claim 1, wherein a non-threaded portion in which a screw is not formed is provided on the inner peripheral portion of the clutch inner and a clearance between the non-threaded portion and the shaft is equal to or less than a predetermined value.

3. A charging generator provided with a one-way clutch, said one-way clutch comprising:

a clutch inner installed on a shaft of a rotor of said generator; and a clutch outer interposed between the clutch inner and a pulley driven by a power unit and transmitting power only in one rotational direction from the pulley to the shaft;

wherein the clutch outer is integrally formed with the pulley.

4. The charging generator according to claim 3, wherein a male screw is formed on the shaft, a female screw is formed on an inner peripheral portion of the clutch inner and the female screw is engaged with the male screw thereby fixing the clutch inner to the shaft.

5. A charging generator provided with a one-way clutch, said one-way clutch comprising:
 a clutch inner formed as an integral part of a shaft of a rotor of said generator; and
 a clutch outer interposed between the clutch inner and a pulley driven by a power unit and transmitting power only in one rotational direction from the pulley to the shaft;
 wherein the shaft and the clutch inner are integrally formed.

6. The charging generator according to claim 5, wherein the clutch outer and the pulley are integrally formed.

7. A charging generator provided with a one-way clutch, said one-way clutch comprising:
 a clutch inner installed on a shaft of a rotor of said generator;
 a clutch outer interposed between the clutch inner and a pulley driven by a power unit through a belt; and
 rollers interposed between the clutch outer and the clutch inner and transmitting power only in one rotational direction from the pulley to the shaft through the rollers;
 wherein a pair of bearings are installed between the clutch outer and the clutch inner interposing the rollers in an axial direction for supporting a load of the pulley and sealing members are provided on side faces of the pair of bearings counter to the rollers for sealing the pair of bearings.

8. The vehicular charging generator according to claim 7, wherein lubricants are filled in the pair of bearings and peripheral portions of the rollers.

9. The charging generator according to claim 7, wherein a first outer diameter at a portion of an outer peripheral portion of the clutch inner opposing the rollers is equal to a second outer diameter of a portion thereof in which the pair of bearings are installed.

10. The charging generator according to claim 7, wherein a flange protruding in a radial direction is installed on the clutch inner, a washer is installed on the shaft and the pair of bearings are interposed by the washer and the flange.

* * * * *

(12) REEXAMINATION CERTIFICATE (4774th)
United States Patent
Zenmei et al.

(10) Number: US 5,575,366 C1
(45) Certificate Issued: Apr. 22, 2003

(54) VEHICULAR CHARGING GENERATOR

(75) Inventors: Keisaku Zenmei, Himeji (JP); Keiichi Konishi, Himeji (JP); Shuzo Isozumi, Himeji (JP); Akira Morishita, Himeji (JP)

(73) Assignee: Mitsubishi Denki Kabushiki Kaisha, Tokyo (JP)

Reexamination Request:
No. 90/005,967, Mar. 29, 2001

Reexamination Certificate for:
Patent No.: 5,575,366
Issued: Nov. 19, 1996
Appl. No.: 08/421,914
Filed: Apr. 13, 1995

(30) Foreign Application Priority Data
Nov. 10, 1994 (JP) .............................. 6-276543

(51) Int. Cl.$^7$ .......................... F16D 41/066; H02K 7/10
(52) U.S. Cl. .............................. 192/45; 322/42; 310/78
(58) Field of Search .................. 192/41 R, 45; 474/70; 310/78; 322/12, 40, 41, 42, 43; 384/477

(56) References Cited

U.S. PATENT DOCUMENTS

| | | | | |
|---|---|---|---|---|
| 2,383,872 A | * | 8/1945 | MacPherson | 180/53.7 |
| 2,647,808 A | * | 8/1953 | Spurgeon | 384/477 |
| 2,866,349 A | * | 12/1958 | Heckethorn | 192/41 R |
| 2,955,478 A | * | 10/1960 | Davis | 192/104 C |
| 3,194,368 A | * | 7/1965 | Benson et al. | 192/45 |
| 3,396,977 A | * | 8/1968 | Iguchi | 384/477 |
| 3,563,352 A | | 2/1971 | Stibbe | 192/3.5 |
| 4,725,259 A | * | 2/1988 | Miyata | 474/70 |
| 5,139,463 A | * | 8/1992 | Bytzek et al. | 474/69 |
| 5,156,573 A | | 10/1992 | Bytzek et al. | 474/74 |

FOREIGN PATENT DOCUMENTS

| | | | |
|---|---|---|---|
| EP | 0 068 730 | | 1/1983 |
| EP | 0 154 785 | | 9/1985 |
| EP | 05334711 A2 | * | 8/1993 |
| GB | 2197431 A | * | 5/1988 |
| JP | 56-101353 A | * | 8/1981 |
| JP | 59-155346 | | 10/1984 |
| JP | 60-131046 A | * | 7/1985 |
| JP | 62-144546 A | * | 6/1987 |

* cited by examiner

Primary Examiner—Rodney H. Bonck (57) ABSTRACT

A vehicular charging generator provided with a one-way clutch having a clutch inner installed to a shaft of a rotor and a clutch outer interposed between the clutch inner and a pulley driven by a power unit for driving a vehicle and transmitting a power only in one rotational direction from the pulley to the shaft, wherein a male screw is formed on the shaft, a female screw is formed on an inner peripheral portion of the clutch inner and the female screw is engaged with the male screw thereby fixing the clutch inner to the shaft.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 5, 7, 9 and 10 are determined to be patentable as amended.

Claims 4, 6 and 8, dependent on an amended claim, are determined to be patentable.

1. A charging generator provided with a one-way clutch, said one-way clutch comprising:
   a clutch inner installed on a shaft of a rotor of said generator; and
   a clutch outer interposed between the clutch inner and a pulley driven by a power unit and transmitting power only in one rotational direction from the pulley to the shaft;
   wherein a male screw is formed on the shaft, a female screw is formed on an inner peripheral portion of the clutch inner and the female screw is engaged with the male screw, thereby fixing the clutch inner to the shaft; *and*
   *wherein a non-threaded portion in which a screw is not formed is provided on the inner peripheral portion of the clutch inner and a clearance between the non-threaded portion and the shaft is set so that eccentricity due to a clearance between an engaging portion of the male screw and the female screw is restricted.*

3. A charging generator [provided with] *comprising:*
   *a shaft of a rotor of said generator;*
   *only one pulley installed on the shaft, the pulley being driven by a power unit; and*
   a one-way clutch, [said] *the* one-way clutch [comprising:] *including*
   *a)* a clutch inner installed on [a] *the* shaft [of a rotor of said generator]; and
   *b)* a clutch outer interposed between the clutch inner and [a] *the* pulley [driven by a power unit] and transmitting power only in one rotational direction from the pulley to the shaft;
   wherein the clutch outer is integrally formed with the pulley.

5. A charging generator [provided with] *comprising:*
   *a shaft of a rotor of said generator;*
   *only one pulley installed on the shaft, the pulley being driven by a power unit; and*
   a one-way clutch, [said] *the* one-way clutch [comprising:] *including*
   *a)* a clutch inner formed as an integral part of [a] *the* shaft [of a rotor of said generator]; and
   *b)* a clutch outer interposed between the clutch inner and [a] *the* pulley [driven by a power unit] and transmitting power only in one rotational direction from the pulley to the shaft;
   wherein the shaft and the clutch inner are integrally formed.

7. A charging generator provided with a one-way clutch, said one-way clutch comprising:
   a clutch inner installed on a shaft of a rotor of said generator;
   a clutch outer interposed between the clutch inner and a pulley driven by a power unit through a belt; and
   rollers interposed between the clutch outer and the clutch inner and transmitting power only in one rotational direction from the pulley to the shaft through the rollers;
   wherein a pair of bearings [are] *is* installed between the clutch outer and the clutch inner interposing the rollers in an axial direction for supporting a load of the pulley and sealing members [are provided on side faces of the pair of bearings counter to the rollers for sealing the pair of bearings] *for shielding the pair of bearings from the rollers are provided on inner sides of the pair of bearings.*

9. The charging generator according to claim 7, wherein a first outer diameter at a portion of an outer peripheral portion of the clutch inner opposing the rollers is equal to a second outer diameter of a portion thereof in which the pair of bearings [are] *is* installed.

10. The charging generator according to claim 7, wherein a flange protruding in a radial direction is installed on the clutch inner, a washer is installed on the shaft and the pair of bearings [are] *is* interposed [by] *between* the washer and the flange.

* * * * *